July 20, 1943.  L. A. WOOLLEY  2,324,970
EXERCISING DEVICE
Filed Nov. 12, 1940  3 Sheets-Sheet 1

LOUIS A. WOOLLEY,
INVENTOR.

BY Donald E. Windle.
ATTORNEY.

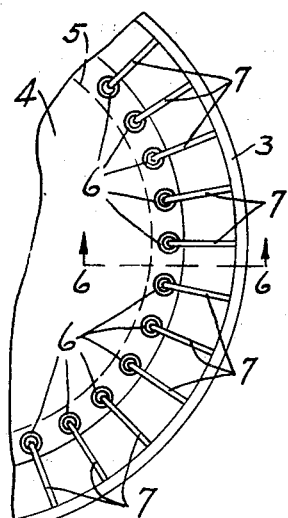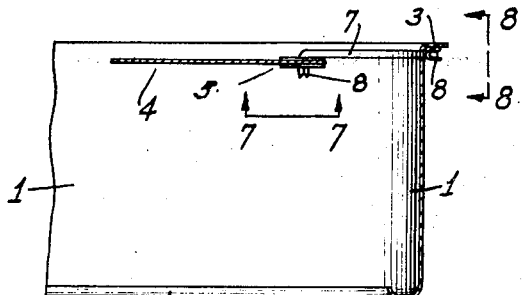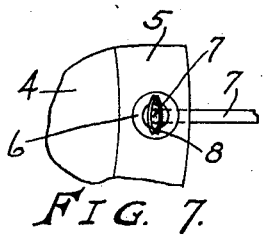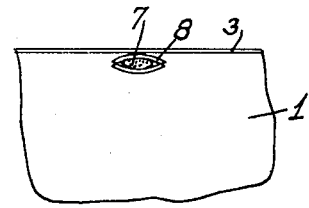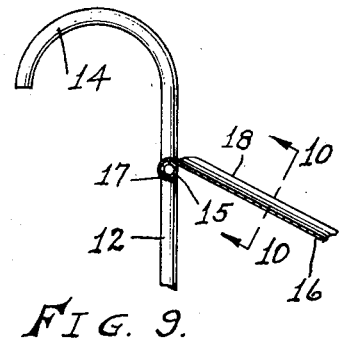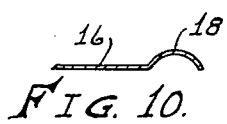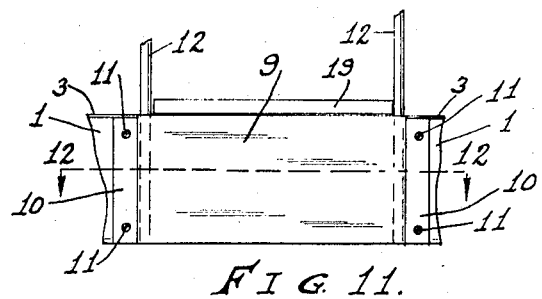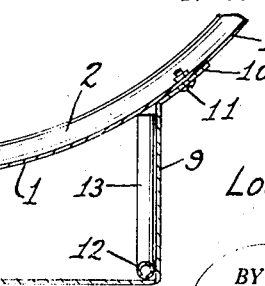

July 20, 1943. L. A. WOOLLEY 2,324,970
EXERCISING DEVICE
Filed Nov. 12, 1940 3 Sheets-Sheet 3

LOUIS A. WOOLLEY,
INVENTOR.

BY Donald E. Windle
ATTORNEY.

Patented July 20, 1943

2,324,970

UNITED STATES PATENT OFFICE 2,324,970

EXERCISING DEVICE

Louis A. Woolley, Xenia, Ohio

Application November 12, 1940, Serial No. 365,194

1 Claim. (Cl. 272—60)

My present invention relates to exercising devices, more especially to a device comprising a combination of exercise and amusement mediums which encourage the use thereof by juveniles.

The principal object of the invention is the provision of a combination of members embodying amusement and exercising mediums which are adapted to both indoor and out of door use.

A second object of the invention is the provision of a device which encourages exercise of both juveniles and adults.

A third object of the invention is the provision of a device, the construction of which is not limited to any particular materials, but which may be manufactured of different materials available to the manufacturer.

Another object of the invention is the provision of a device which may be easily dismantled and stored in a comparatively small space, which is simple of construction, which is economical to manufacture, and which provides healthful benefits through the use thereof.

A further object of the invention is the provision of a new article of manufacture.

Other objects and advantages of the invention will suggest themselves in the course of the following description, and that which is new will be pointed out in the appended claims.

The most satisfactory means of carrying out the principles of the invention in a practical, comprehensive, and efficient manner is shown in the accompanying three sheets of drawings, in which:

Figure 5 is a partial top plan view of the device taken from line 5—5 of Figure 1, and on an enlarged scale.

Figure 6 is a detail vertical section through one side of the device taken on line 6—6 of Figure 5.

Figure 7 is a partial under side view of the device taken from line 7—7 of Figure 6.

Figure 8 is a partial detail elevation taken from line 8—8 of Figure 6.

Figure 9 is a sectional-elevational detail showing the upper portion of one of the upright members, the cross bar, and the slide member, taken from line 9—9 of Figure 4.

Figure 10 is a detail section through an edge of the slide member taken on line 10—10 of Figure 9.

Figure 11 is a partial detail front elevation taken from line 11—11 of Figure 1.

Figure 12 is a horizontal detail section through the front portion of the device taken on line 12—12 of Figure 11.

Like characters designate like parts throughout the several views.

Figure 1:
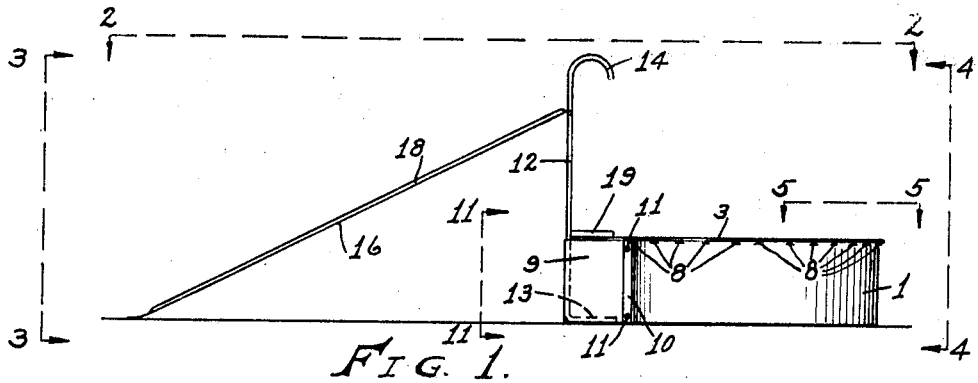
Figure 1 is a side elevation of one form of the device in assembled condition.
Figure 2:
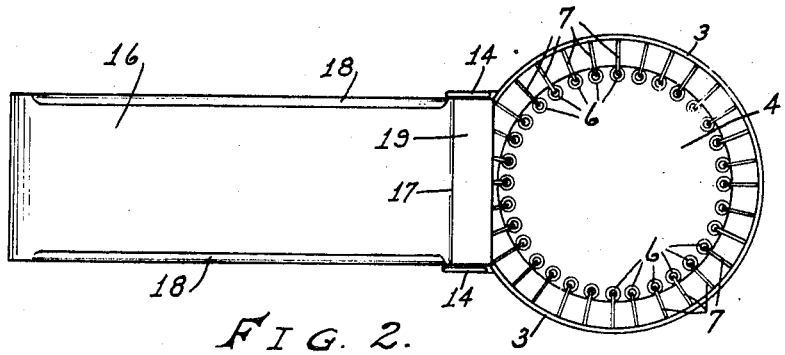
Figure 2 is a top plan view of the device taken from line 2—2 of Figure 1.
Figure 3:
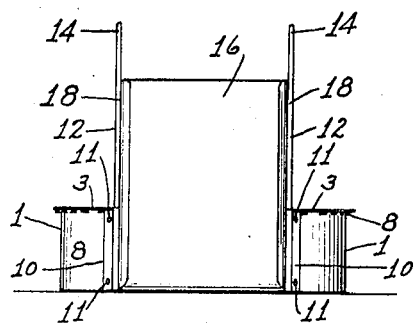
Figure 3 is a front elevation of the device taken from line 3—3 of Figure 1.
Figure 4:
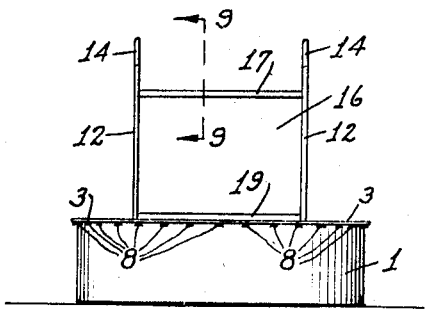
Figure 4 is a rear elevation of the device taken from line 4—4 of Figure 1.

In order that the construction and the advantages of the invention may be more fully understood and appreciated, I will now take up a detailed description thereof, in which I will set forth the same as fully and as comprehensively as I may.

In the drawings, 1 designates the drum or supporting member of the device, with the lower edge portion 2 thereof forming a rounded shape upon which the device is adapted to rest. The outwardly extending flange 3 is provided by the upper edge of the member 1 and is preferably formed integrally therewith and provides strength thereto. Apertures are formed through the upper portion of the drum member 1 for the purpose hereinafter set forth.

The drum member 1, together with the members 2 and 3, are preferably formed of metal, but paper board, wood, or other suitable materials may be successfully used in the construction of the members. The drum member, while shown as circular, may be oval, square, oblong, polygonal, or of any suitable and desirable design without sacrificing any of the necessary rigidity and strength.

A centrally positioned member 4 of proportionately less area than the drum member is held in suspended relation within the drum member by means of elastic members 7. The outer peripheral edge of the centrally positioned member has a reinforcing member 5 secured to the under side thereof. Apertures are formed through the outer edge portion of the central member 4 and the reinforcing member 5, with the eyelets 6 being provided therein through which the inner ends of the elastic members 7 extend. The outer ends of the elastic members extend through the apertures which are formed through the upper portion of the drum member 1. Clamp members 8 are formed of washers through which the inner and outer end portions of the elastic members 7 are threaded, after which the washers are bent over in clamping relation with the elastic members as shown in Figures 6, 7, and 8. The elastic members, as shown, are made of stranded rubber of the proper elasticity, but tension springs or other suitable members may be substituted without distracting materially from the functions intended. The central member 4 is preferably formed of heavy canvas, but a heavy rubber member or other suitable material may be substituted therefor without materially reducing the efficiency thereof. The central member 4 is normally held in taut and resilient condition by means of the elastic members 7.

A slide-supporting base member 9 having flange members 10 formed thereon is provided at the forward or front side of the drum 1 and is removably secured therethrough by means of the threaded bolts 11. Upright members 12 extend upwardly from the forward corners of the base member 9 as shown in Figures 1, 3, 4, 11, and 12. The lower end portions 13 of the upright members 12 are turned rearwardly and are adapted to bear upon a floor or other support. The upper end portions 14 of the upright members are curved rearwardly and downwardly and provide handles. The cross member 15 extends between the uprights 12 providing rigidity thereto and also provides means of support for the upper end portion of the slide member.

The slide member 16 has the upper end 17 formed thereon with the end 17 engaging the cross bar 15, and is removably engageable therewith. The outer edges 18 of the slide member are preferably formed concavo-convex to provide smooth edges and also to provide longitudinal rigidity to the member. The lower or forward end of the slide member is curved slightly as shown in Figure 1 to provide a smooth surface resting on a floor or other supporting surface.

A footboard or step 19 is provided over the top of the supporting base 9 and may be rigidly secured thereto.

Figure 13:
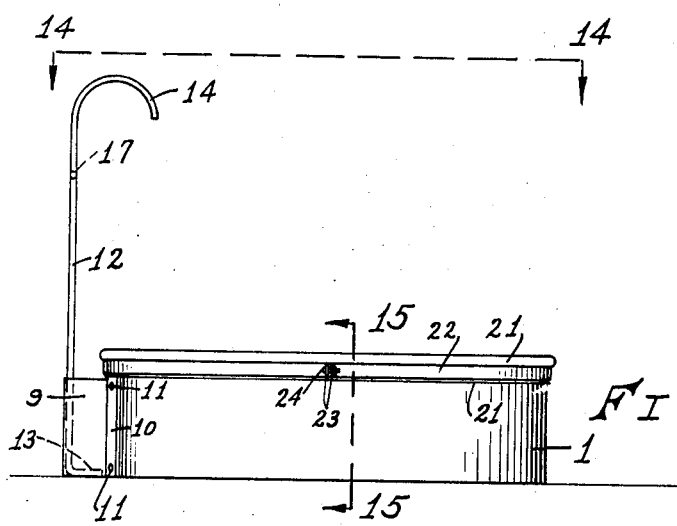
Figure 13 is a side elevation of a modification of the device without the slide member being attached thereto.
Figure 14:
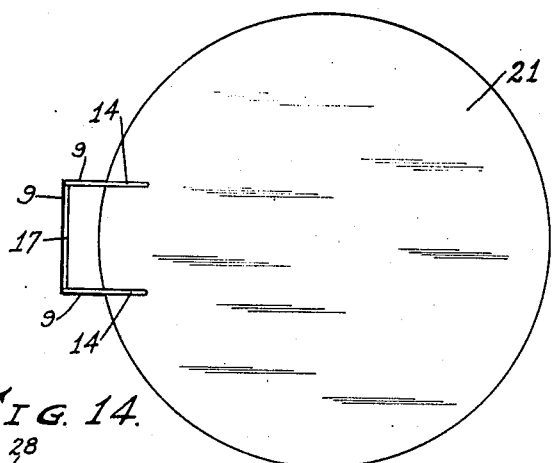
Figure 14 is a top plan view of the device taken from line 14—14 of Figure 13.
Figure 15:
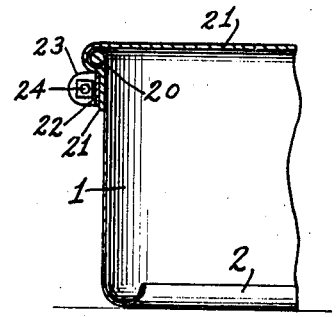
Figure 15 is a detail vertical section through the device taken on line 15—15 of Figure 13.

In the modified form of the device as shown in Figures 13, 14, and 15, the vertical portion of the drum is indicated by 1, with the bottom edge being designated by 2. The upper edge is formed into a rolled edge 20. The top cover 21 is formed of a single sheet of elastic material, preferably rubber, having its edges turned downwardly over the rolled edge with the same being clamped in position by means of the strap 22 having the out-turned ears 23, and with the threaded bolt 24 providing the means for securing the strap around the down-turned edge of the cover 21.

Figure 16:
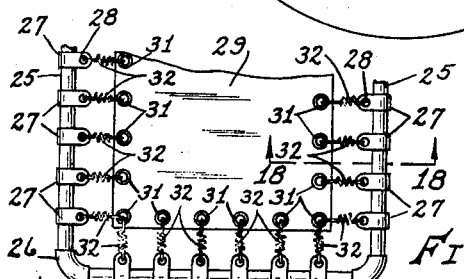
Figure 16 is a partial plan view of the device modified and constructed with a frame formed of tubing and with the central member being suspended by means of tension springs.
Figure 18:
Figure 18 is a detail sectional view taken on line 18—18 of Figure 16.
Figure 17:
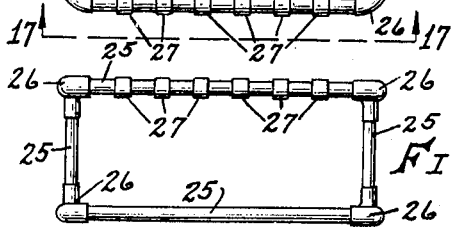
Figure 17 is a detail elevational detail taken from line 17—17 of Figure 16.

In the modification shown in Figures 16, 17, and 18, 25 designates tubing forming top and bottom frames with the members being secured together at their ends by the corner members 26. Clip members 27 are provided at intervals on the top tubing members with apertures 28 being formed therethrough for attaching the outer ends of the tension springs 32 as shown in Figures 16 and 18. A central member 29, having the reinforcing member 30 on its under side, is provided and is held in suspended relation with the upper frame by means of the inner ends of the tension springs 32 extending through the eyelets 31.

The device is principally intended for juvenile exercise and amusement, but is equally useful in gymnasiums for adult exercise when furnished in proportionate sizes.

The device may be used as a bounding device exclusively if the slide is removed therefrom. The device, when used for bounding, provides excellent exercise for athletes for developing leg, arm, and body mucles. Drum sticks may also be used with the device, using the central portion thereof as a drum head, thereby providing further amusement for juveniles without causing objectionable or disconcerting noises to other persons nearby.

I desire that it be understood that the utility of the device resides in its use rather than in the specific design and construction thereof. I therefore desire that I be not limited to the specific construction shown or to the materials described herein in the construction of the device.

I desire that it be further understood that minor changes may be made in the arrangement of the parts herein shown and described, insofar as the changes may fall within the scope of the appended claim.

Having now fully shown and described the invention, what I claim, and desire to secure by Letters Patent of the United States, is:

A portable exercising device comprising in combination, a rigid drum member having a central member resiliently suspended therein, a supporting base member removably secured through the drum member with uprights extending upwardly from the supporting base member with the upper ends of the uprights forming handles by which the user of the device may balance himself.

LOUIS A. WOOLLEY.